United States Patent [19]

Butte

[11] Patent Number: 4,773,997

[45] Date of Patent: Sep. 27, 1988

[54] FILTERING APPARATUS FOR CONTAMINANT REMOVAL

[76] Inventor: John C. Butte, 10 Columbia Ave., Redwood City, Calif. 94061

[21] Appl. No.: 819,242

[22] Filed: Jan. 15, 1986

[51] Int. Cl.⁴ .............................................. B01J 47/00
[52] U.S. Cl. .................................................. 210/282
[58] Field of Search ............................. 210/681–688, 210/266, 280, 282

[56] References Cited

U.S. PATENT DOCUMENTS

| | | | |
|---|---|---|---|
| 2,616,847 | 11/1952 | Ginell | 210/2 |
| 2,743,154 | 4/1956 | Kaufman | 23/14.5 |
| 2,752,309 | 6/1956 | Emmons | 210/24 |
| 4,025,427 | 5/1977 | Loeb | 210/687 |
| 4,035,292 | 7/1977 | Himsley | 210/33 |
| 4,054,320 | 10/1977 | Learmont | 299/4 |
| 4,432,893 | 2/1984 | Lee | 252/631 |

OTHER PUBLICATIONS

BIO-RAD PROTEAN II Slab Cell and Model 556 Gel Destainer, pp. 178–180.
pp. 123, 124 of a Pharmacia Fine Chemicals Catalogue showing "Gel Destainer GD-4 II."
pp. 126, 127 of a BIO-RAD Catalogue Showing a Diffusion Destainer Model 172A.

*Primary Examiner*—Ivars Cintins
*Attorney, Agent, or Firm*—Cushman, Darby & Cushman

[57] ABSTRACT

Apparatus for filtering radioactive contamination from a contaminated medium by leaching the contamination from the medium into a liquid and removing the radioactivity from solution by passing it through an ion exchange resin. The apparatus includes a container having a base and side wall, a filter cartridge disposable on the base of the container and a basket having a wall through which fluid held in the container flows. The basket is disposable adjacent the cartridge in the container. The cartridge has a central cavity bounded by a first filter wall and a second filter wall spaced outwardly from the first filter wall, with the two filter walls having a selected mesh size to capture the contaminated medium. A first and second barrier extend in spaced relation to one another and between the first and second filter walls to define a filter medium enclosure surrounding the central cavity. A magnetic stirrer is used to induce liquid flow in the container, including flow through the cartridge and basket.

14 Claims, 3 Drawing Sheets

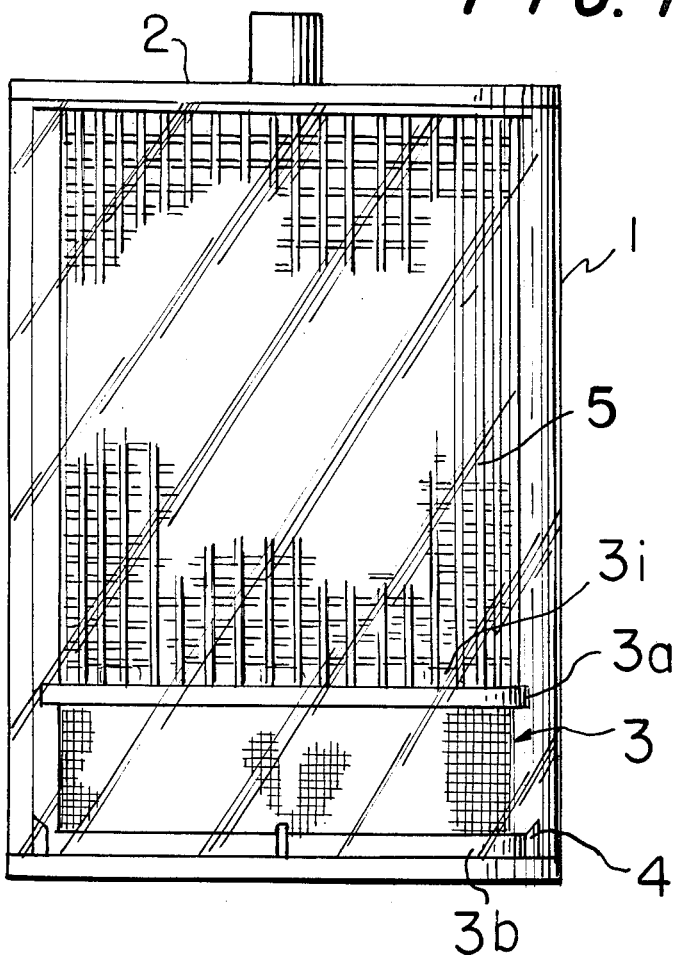
FIG. 1
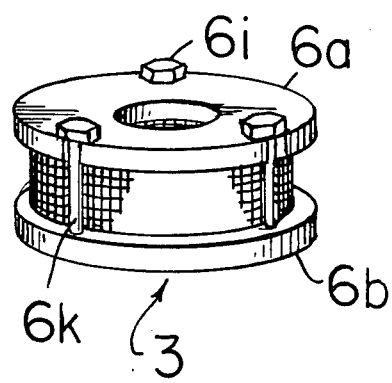
FIG. 6
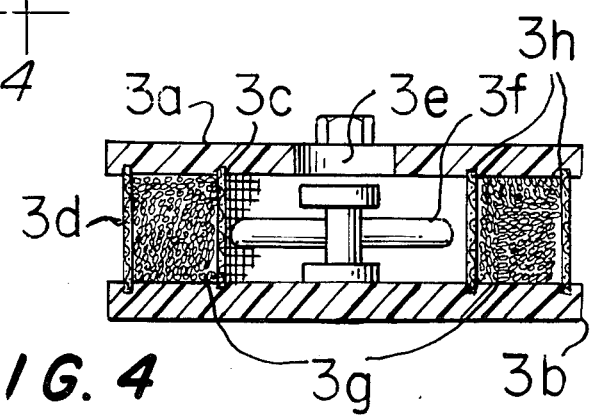
FIG. 3
FIG. 4

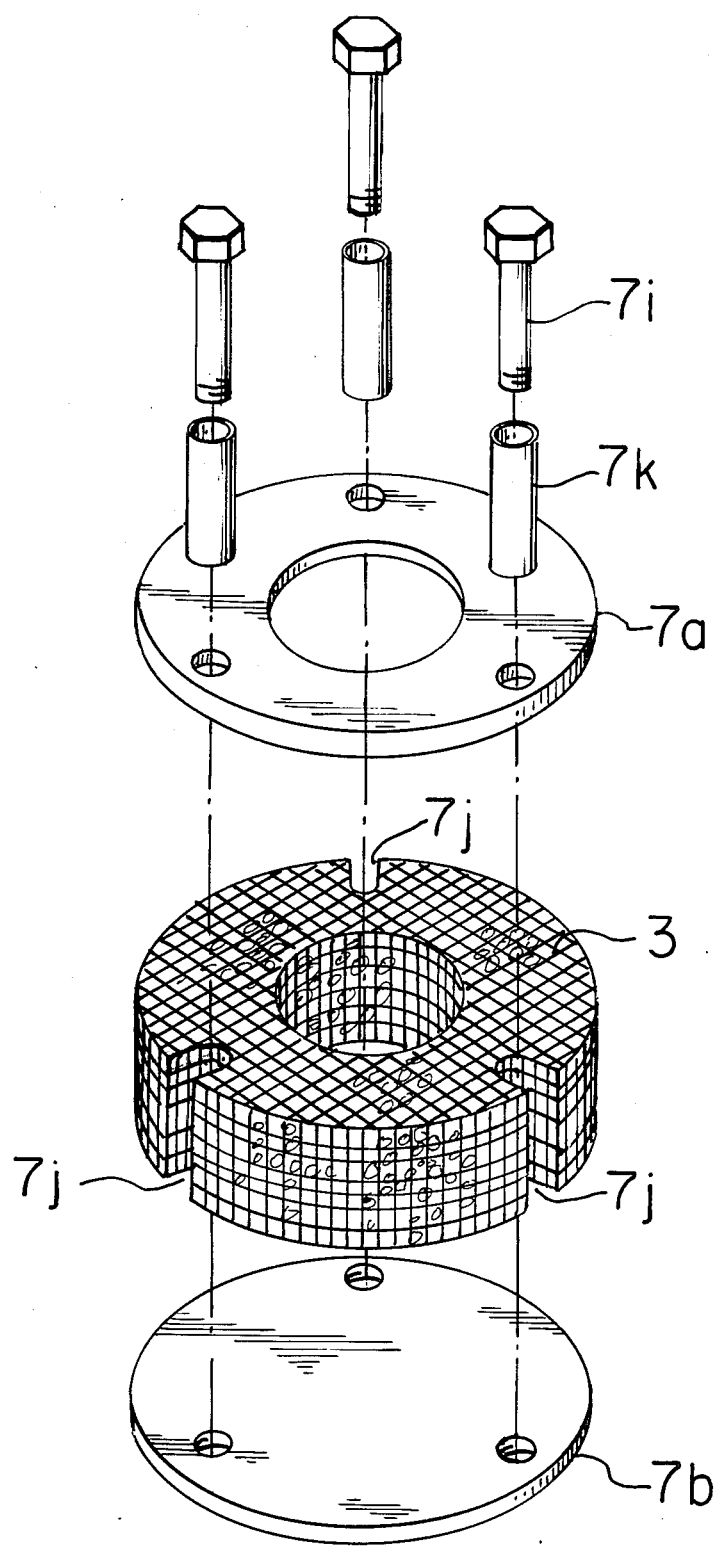
F I G. 7

FILTERING APPARATUS FOR CONTAMINANT REMOVAL

This invention generally relates to a device used for the removal of radioactive isotopes from contaminated solutions. In particular, it provides an efficient yet simple device which makes the handling of liquid radioactive wastes generated in a laboratory safer and easier, removing contaminants from leachable materials by passing them through a liquid permeable ion exhchange bed.

Many biological research procedures generate liquid ionic radioactive waste, as well as contaminated materials associated with the use of these liquids, such as filter papers. This radioactive waste must be disposed of in a proper manner, and the exposure of those who work around it must be minimized.

Disposal of this waste may take many forms depending upon the concentration and type of radioactive material involved. Some isotopes can be eliminated through the sewer system. Others must be stored for a period of time to allow natural decay to decrease the amount of radioactive material present before sewerage may be proper. Certain contaminated waste must be contained in concrete and disposed of as solid waste. All of these methods require physical manipulation of radioactive liquids, making accidental exposure or spillage a potential hazard. Further, the liquids contaminated must be disposed of, and these liquids may be expensive.

Previously, devices for decontaminating liquids have utilized an apparatus wherein the contaminated liquid, held in a container, was pumped to another vessel containing a decontaminating solid, and subsequently recirculated to the original vessel. Such an apparatus requires that a number of streams and containers be contaminated during the process, thereby increasing the possibility of spills and operator contamination.

For these reasons, devices and methods which minimize handling of such radioactive liquids have therefore been sought. It is therefore an object of the present invention to provide a device by which radioactive liquids and associated contaminated materials may be continuously stripped of radioactivity in a single vessel, in a manner which reduces the hazard of spillage and minimizes handling of the liquid. It is a further object of the invention, while minimizing exposure hazard from a radioactive contaminant, to allow re-use of the carrier liquid after it has been stripped of its radioactive component.

SUMMARY OF THE INVENTION

To achieve these objects the present invention is a filter apparatus comprising a single container for liquids with a filtering cartridge and basket held within the container. Both the cartridge and basket are made from wire or plastic mesh to allow a contaminated liquid to easily flow through them. The filtering cartridge contains a strong anion/cation ion exchange medium to decontaminate the liquid as it is circulated through the cartridge by a pumping system.

In an exemplary embodiment, this apparatus consists of a cylindrical container, which may be made from a strong acid resistant plastic, such as "Lucite", in which a cartridge filter medium formed of a mixed bed of strong anion/cation exchange resin material is placed. This ion exchange cartridge is made up of two plates which may also be constructed of "Lucite", and are separated by two circular small mesh stainless steel screens which form an annular ring containing the ion exchange resin. A hole in the top center of the upper cartridge plate allows liquid, such as a liquid contaminated by radioactive isotopes, to enter a center chamber within the inner screen of the cartridge. A rotating stirring bar locating in this center chamber pushes the radioactive liquid from the center chamber horizontally through the mixed bed ion exchange resin of the cartridge, allowing removal of the ionically charged radioactive components. The isotope free liquid then moves up the inside of the walls of the container and mixes with any newly introduced radioactive material, and the mixture is again circulated through the ion exchange resin cartridge.

A wire mesh basket is placed above the resin cartridge so that contaminated solids such as filter paper may be decontaminated. Such solids are placed in this basket and the solution is circulated within the container, passing over the solids, picking up isotopes to be transferred to the ion resin. The basket generally has a bottom displaced from the area immediately above the top center passage of the top surface of the cartridge, to avoid interferring with the flow of the circulating liquid to the center chamber of the cartridge.

In an alternative embodiment the ion exchange cartridge consists of ion exchange resin fully surrounded by mesh of wire or plastic, forming an integral doughnut shaped cartridge, again held in place by upper lower "Lucite" plates. Thus removal of the cartridge is made simpler and the hazard of spilling the contaminated resin is decreased.

In practice, the ion exchange cartridge can be used until signs of incomplete isotope removal appear. The cartridge is then dried, emptied and the resin disposed of as a dry radioactive waste, or, if the isotope has a short half-life, the resin may be stored and disposed of as a normal solid waste. In this manner the handling of radioactive liquids is reduced and a cleansed liquid which is suitable for reuse is achieved.

The invention will be better understood by careful study of the following detailed description of the presently preferred exemplary embodiment and alternative embodiments taken in conjunction with the accompanying drawings, of which:

GENERAL DESCRIPTION OF THE DRAWINGS

FIG. 1 is a side elevation of an exemplary embodiment of the ion removal apparatus;

FIG. 3 is a plan view of the ion exchange resin cartridge separated from the ion removal apparatus container, showing the resin bed and stirring mechanism;

FIG. 4 is a cross-section of the ion exchange resin cartridge removed from the ion removal apparatus container, taken along line 4—4 of FIG. 3;

FIG. 6 is a perspective view of an alternative embodiment of the ion exchange resin cartridge; and FIG. 7 is an exploded view of an alternative embodiment of the ion exchange cartridge.

DETAILED DESCRIPTION OF THE DRAWINGS

Figure 2:
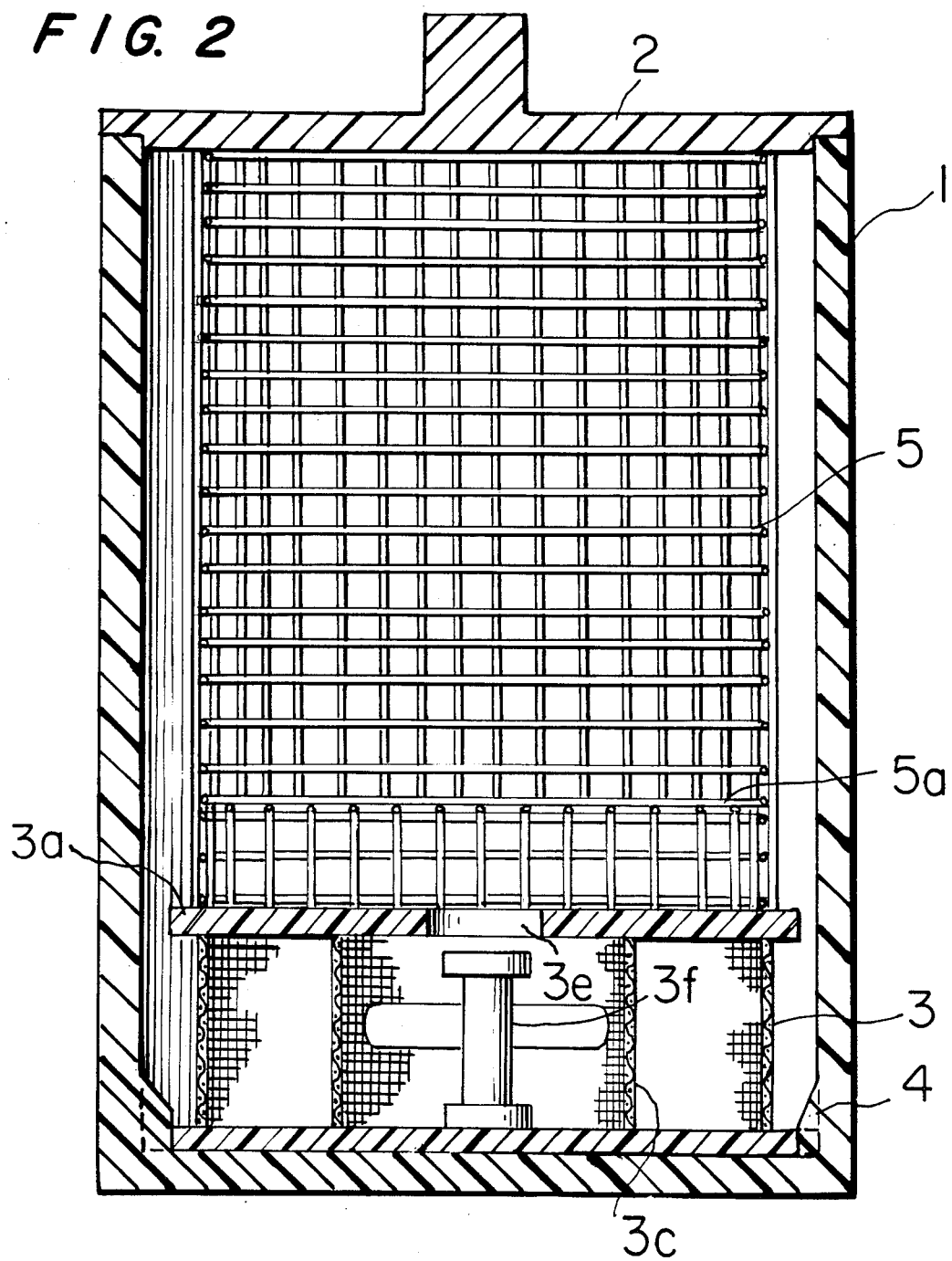
FIG. 2 is an enlarged vertical cross-section of an exemplary embodiment of the ion removal apparatus.

An exemplary embodiment of the removal apparatus is shown in FIGS. 1-4. FIG. 1 shows a container 1, made from a clear hard acid resistant plastic such as "Lucite". Container 1 is generally cylindrical in shape and loosely covered by circular cover plate 2, constructed of the same material.

Within container 1, resting on the bottom thereof, is ion exchange resin cartridge 3, held in position by centering guides 4. Ion exchange resin cartridge 3 is further depicted in FIGS. 3 and 4.

FIG. 3 is a plan view showing inner screen 3c and outer screen 3d of fine wire mesh, arranged so as to retain ion exchange resin beads (not shown in FIG. 3, but shown in FIG. 4), but still allow an unimpeded flow of liquid through the screens resulting from the movement of the stir bar within stir bar assembly 3f.

Stir bar assembly 3f is of the magnetic type and is disposed within the center hole of ion exchange resin cartridge 3. In the preferred embodiment, the stir bar cartridge 3f is mounted so as to be retained within cartridge 3, but may, in another embodiment, be attached to the bottom of container 1 such that the ion exchange resin cartridge would be inserted around stir bar assembly 3f and centered in place thereby.

Screws 3i are placed around cartridge 3, through top 3a and bottom 3b to secure top 3a and bottom 3b against screens 3c and 3d. Top 3a and bottom 3b, also referred to as first and second barrier means, are formed preferably of plates of "Lucite".

FIG. 4 shows a side view of ion exchange resin ring 3, taken along line 4—4 of FIG. 3. Ion exchange resin beads 3g are shown held within the annular space defined by screens 3c and 3d, and top 3a and bottom 3d.

Top 3a contains a passage 3e somewhat smaller than the center hole within which stir bar assembly 3f sits. Bottom 3b is a solid plate. Top 3a and bottom 3b contain grooves 3h on the side facing resin beads 3g so that inner and outer screens 3c and 3d ride within the grooves and are held in place thereby. Both top 3a and bottom 3b are constructed from a clear hard plastic such as "Lucite", like container 1.

In the preferred embodiment the ion exchange resin cartridge 3 is placed within container 1, and held in place by guides 4. Basket 5 is inserted into container 1, resting on cartridge 3.

Positioned above ion exchange resin cartridge 3, within containment vessel 1, is metal wire basket 5, used to contain material such as filter paper (not shown) which is to be decontaminated along with contaminated radioactive liquid (not shown). Wire basket 5 rests upon the top plate 3a of ion exchange resin cartridge 3, and is constructed of stainless steel. Screws 3i hold cartridge top plate 3a and bottom plate 3b together. The wire comprising wire basket 5 is of mesh large enough so as not to impede the flow of the liquid within container 1, but small enough to keep solid objects to be decontaminated within the basket while the liquid circulates.

FIG. 2 is an enlarged cross-section of the preferred embodiment shown in FIG. 1, generally including container 1, cover 2, ion exchange resin cartridge 3, centering guides 4 and basket 5. Magnetic stir bar assembly 3f is shown disposed within the center hole of cartridge 3, within the area defined by the inner screen 3c. Resin beads 3g are not shown in FIG. 2.

In this preferred embodiment, as in FIG. 1, basket 5 is shown to have its bottom 5a, also of wire mesh, displaced slightly above the top surface 3a of cartridge 3. In this manner materials contained within basket 5 will not block circulation from basket 5 through passage 3e of top surface 3a. Centering guides 4 hold cartridge 3 centered within container 1 such that liquid circulated horizontally through cartridge 3 by stir bar assembly 3f is forced out of cartridge 3 and up the walls of container 1.

Figure 5:
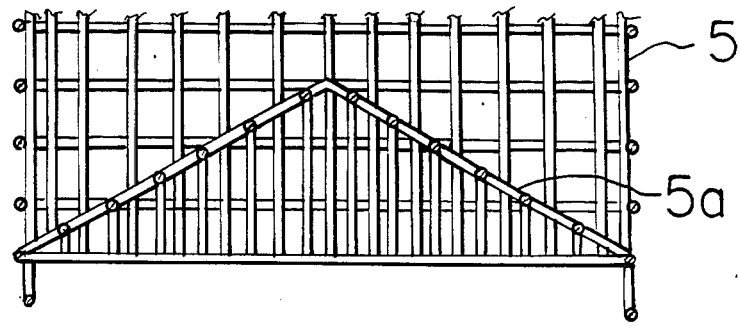
FIG. 5 is a fragmented side elevation of an alternative embodiment of the wire mesh basket of the invention.

FIG. 5 depicts wire mesh basket 5 in an alternative embodiment, showing basket 5 of generally cylindrical shape, sized to fit within containment vessel 1. In this alternative embodiment the bottom 5a has been made cone shaped to further improve liquid flow and keep material contained within basket 4 away from the inlet passage 3e in top 3a of cartridge 3. In this manner the bottom 5a is not flush with the top of cartridge 3 in operation, and material held within basket 4 will not block the flow of liquid.

FIGS. 6 and 7 are views of an alternative embodiment of ion exchange resin cartridge 3. In this embodiment top 6a and bottom 6b contain holes in which holding screws 6i are assembled. FIG. 6 shows the holding screws in position and FIG. 7 shows an exploded view of this alternative embodiment. In FIG. 7 it can be seen that the ion exchange resin is fully surrounded by small mesh screen, also referred to as enclosing means, rather than being surrounded only at the periphery by such a screen as in the preferred embodiment. Screws 7i are fitted within sleeves 7k, then inserted through holes in the top plate 7a and bottom plate 7b. Screws 7i hold the ion exchange resin cartridge 3 in position via niches 7j. This alternative embodiment allows for quicker removal of exhausted ion exchange resin, without the hazard of spilling. The resin cartridge may then be set aside to dry and the entire screen/ion exchange resin disposed of at the same time.

Although only one exemplary embodiment and one alternative have been described in detail, those skilled in the art will recognize that many modifications and variations may be made in these embodiments while yet retaining many of the novel features and advantages of this invention. Accordingly, all such variations and modifications are intended to be included within the scope of the appended claims.

What is claimed is:

1. A filter apparatus comprising a container for liquids having a base and side wall means, a filtering cartridge means disposable on said base in said container, a first liquid permeable filter wall defining a central cavity, a second liquid permeable filter wall spaced outwardly of said first filter wall, said first and second filter walls having a selected mesh size, non-liquid permeable first and second barrier means extending in spaced relation to one another and between said first and second filter walls to define a filter medium enclosure surrounding said central cavity, one of said barrier means including an opening exposing said central cavity, said container including means for inducing liquid flow in said container including flow in a single direction through said barrier means opening, central cavity, first filter wall, filter medium enclosure, and second filter wall.

2. The filter apparatus as claimed in claim 1, wherein said first and second filter walls and first and second barrier means are formed as a cartridge means removably disposed in said container.

3. The filter apparatus as claimed in claim 2, wherein said means for inducing liquid flow in said container includes a rotatable member removably disposed in said cartridge means.

4. The filter apparatus as claimed in claim 3, wherein said rotatable member is magnetically movable and disposed in said central cavity.

5. The filter apparatus as claimed in claim 2, wherein said cartridge means includes means for holding removably said first and second barrier means in an operating position and means enclosing for a filter medium and placeable in said filter medium enclosure, said enclosing means including said first and second filter wall means.

6. The filter apparatus as claimed in claim 1, wherein at least one of said barrier means is sized to provide a space between said one barrier means and said side wall means of said container.

7. The filter apparatus as claimed in claim 1, further comprising a cover disposed on top of said container and wherein said container has a selected height such that said container and cover fully enclose said filtering cartridge means when said cover is disposed on top of said apparatus.

8. The filter apparatus as claimed in claim 1, wherein at least one of said barrier means is removable from said first and second filter walls to allow replacement of filter medium in said filter medium enclosure.

9. The filter apparatus as claimed in claim 1 which further includes basket means for containing contaminated material, said basket means being disposable adjacent said opening of said one barrier means and having liquid-permeable sides to allow free-flow of liquid between said central cavity, the interior of said basket and the exterior of said basket.

10. The filter apparatus as claimed in claim 9, wherein said basket is disposed above said one barrier means and has a bottom for supporting contaminated material, said apparatus further comprising means for spacing said basket bottom from said opening of said one barrier means.

11. The filter apparatus as claimed in claim 10, wherein said bottom of said basket means extends upwardly inwardly so that a central region of said bottom is spaced further from said one barrier means than the outer edges of said bottom.

12. The filter apparatus as claimed in claim 11, wherein said outer edges of said bottom of said one barrier means contact said barrier means.

13. The filter apparatus as claimed in claim 1, which further includes an ion exchange resin filter medium disposed in said filter medium enclosure.

14. The filter apparatus as claimed in claim 13, wherein said ion exchange resin filter medium is formed of a strong anion/cation exchange resin.

* * * * *